United States Patent [19]

Holmes et al.

[11] Patent Number: 4,836,737

[45] Date of Patent: * Jun. 6, 1989

[54] WHEEL LIFT TOW ASSEMBLY

[75] Inventors: Gerald E. Holmes, Chattanooga, Tenn.; Jerry E. Pace, Rossville, Ga.

[73] Assignee: Century Wrecker Corporation, Ooltewah, Tenn.

[*] Notice: The portion of the term of this patent subsequent to Jul. 14, 2004 has been disclaimed.

[21] Appl. No.: 27,414

[22] Filed: Mar. 18, 1987

Related U.S. Application Data

[63] Continuation of Ser. No. 702,739, Feb. 19, 1985, Pat. No. 4,679,978, which is a continuation of Ser. No. 530,517, Sep. 9, 1983, abandoned.

[51] Int. Cl.⁴ .............................................. B60P 3/12
[52] U.S. Cl. .................................................. 414/563
[58] Field of Search ........................ 414/563, 426–430; 280/402

[56] References Cited

U.S. PATENT DOCUMENTS

| | | | |
|---|---|---|---|
| 3,182,829 | 5/1965 | Wagner | 414/563 |
| 3,285,443 | 11/1966 | Gaumont | 414/563 |
| 3,434,607 | 3/1969 | Nelson | 414/563 |
| 3,434,608 | 3/1969 | Nelson | 414/563 |
| 3,690,482 | 9/1972 | Gaumont | 414/563 |
| 3,924,763 | 12/1975 | Pigeon | 414/563 |
| 3,951,280 | 4/1976 | Peck | 414/563 |
| 4,384,817 | 5/1983 | Peterson | 414/563 |
| 4,473,334 | 9/1984 | Brown | 414/563 |
| 4,573,857 | 3/1986 | Porter, Sr. et al. | 280/402 X |
| 4,679,978 | 7/1987 | Holmes et al. | 414/563 |

OTHER PUBLICATIONS

American Towman, Sep., 1983, p. 39, Zack-Lift Advertisement.
American Towman, Dec. 1983, p. 56, Zack-Lift Advertisement.

Primary Examiner—Robert J. Spar
Assistant Examiner—David A. Bucci
Attorney, Agent, or Firm—Harness Dickey & Pierce

[57] ABSTRACT

A wheel lift tow assembly 28 is mounted to the frame at the rear of a tow truck 20 and is movable vertically by a power cylinder 60 connected between the frame of the tow truck and the tow assembly. The tow assembly includes a telecopic tow bar 35 that is distended and retracted by a power cylinder 65, and a cross arm 36 which is pivotably mounted intermediate its ends about an upwardly extending axis 89 to the rear portion of the telescopic tow bar. Sleeve members 92, 93 are slidably mounted about the opposite ends of the cross arm, and L-shaped wheel cradles 37, 38 are releasably connected to the sleeve members.

14 Claims, 6 Drawing Sheets

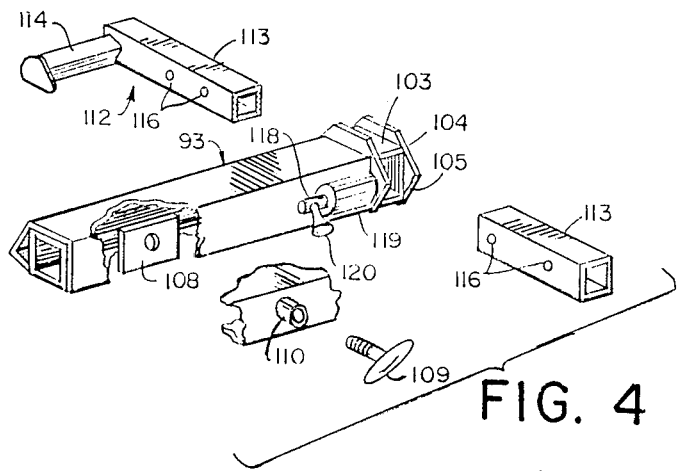
FIG. 4
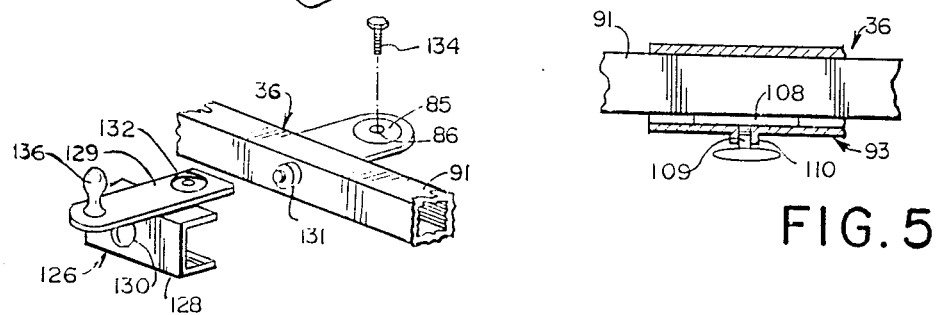
FIG. 5
FIG. 6
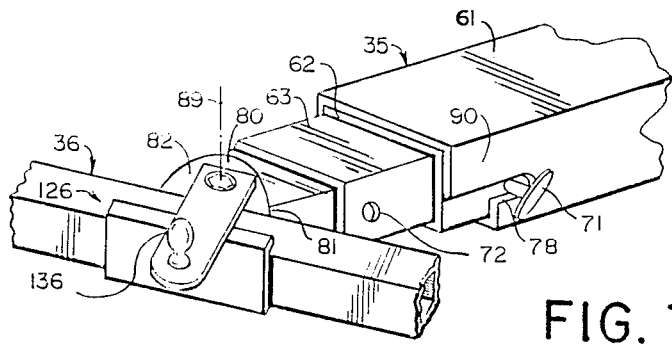
FIG. 7
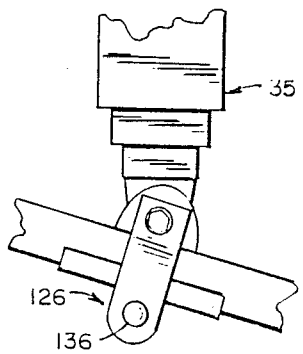
FIG. 8
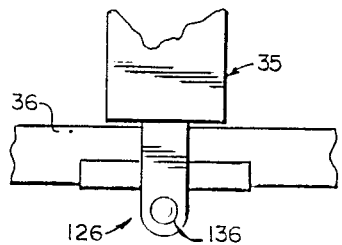
FIG. 9

WHEEL LIFT TOW ASSEMBLY

This application is a continuation of application Ser. No. 702,739 filed Feb. 19, 1985 now U.S. Pat. No. 4,679,987, which is a continuation of application Ser. No. 580,517 filed Sept. 9, 1983 and now abandoned.

BACKGROUND OF THE INVENTION

The invention disclosed herein relates to attachments for tow trucks which lift and tow automobiles and other wheeled vehicles behind the tow truck. More particularly, the invention relates to a tow assembly that includes wheel cradles that receive the front or rear wheels of an automobile and lift the wheels and therefore one end of the automobile from the ground surface without engaging other parts of the automobile.

When an automobile is to be towed, the operator of the tow truck must be very careful that a firm connection is made between the tow truck and the automobile, and also to assure that the automobile will not be damaged as it is lifted and towed. For example, the front and rear ends of automobiles typically include bumpers, lights and other decorative objects that are easily scratched, broken or otherwise damaged. Recently, automobiles have been manufactured with wind deflectors or "spoilers" that protrude downwardly from the front portion of the vehicle, and it is difficult to connect the typical towing device to the automobile without damaging one or more of these objects.

In the past, one of the more popular tow attachments for tow trucks has been a flexible sling attached to a tow bar which extends beneath the automobile that is to be towed and extends around the bumper and is lifted with the typical boom and cable of the tow truck. While the flexible sling tends to protect the bumper and other objects from abrasion, etc., a force is applied by the sling to the front spoiler, the bumper, and other objects that it contacts, such that there is a significant hazard of damaging the automobile.

Other type tow assemblies for connection to tow trucks are available which do not require the conventional sling assembly but include wheel engaging structures or "wheel cradles" which engage the front or rear wheels of an automobile to lift the wheels and therefore one end of the vehicle, substantially without engaging any other portion of the vehicle. Typically, these devices include a tow bar connected to the rear of the tow truck, wheel cradles connected to the tow bar, and a boom and winch assembly that has a cable that extends over the rear of the tow truck and is connected to the tow bar to lift and support the tow bar. Examples of these devices are generally disclosed in U.S. Pat. Nos. 3,434,607, 3,690,482, 3,924,763, and 3,897,879.

Some of the problems present in the prior art wheel lift tow assemblies are that the wheel cradles are difficult to mount to the wheels of the automobile that is to be towed, the tow assembly supports the raised wheels of the automobile at a distance so far from the rear of the tow truck that the weight of the vehicle lifted by the tow truck tends to counterbalance the front of the tow truck such that the steerable wheels of the tow truck do not have enough weight applied to them for safe handling. Other problems include retraction and storage of the tow assembly with respect to the tow truck when the tow assembly is not to be used, and the large size and weight of the wheel cradles and their associated elements which makes the wheel cradles difficult to handle by the truck operator.

SUMMARY OF THE INVENTION

Briefly described, the present invention comprises a wheel lift tow assembly for mounting to a tow truck which inclues a tow bar having telescopic sections that distend and retract, a cross arm pivotably mounted intermediate its ends about an upwardly-extending axis to the rear end portion of the tow bar, and wheel cradles positioned at opposite ends of the cross arm for engaging the wheels of a vehicle to be towed. In one embodiment a parallel linkage is connected to the tow bar, and the parallel linkage is to be connected to the frame at the rear of a tow truck. This maintains the tow bar in a substantially horizontal attitude as it is being raised and lowered by a hydraulic cylinder or other power means connected between the frame and the parallel linkage.

In another embodiment of the invention sleeve members are movably mounted to the opposite end portions of the cross arm and the wheel cradles are releasably connectable to the sleeve members. This permits the wheel cradles to be moved closer together or further apart to accommodate vehicles having wheels spaced apart at different distances. A sling attachment is provided which includes sling support bars mountable to opposite end portions of the cross arm, and flexible sling straps are attached at one of their ends to the sling support bars. This enables the tow assembly to be used in a configuration similar to the conventional sling lift arrangement. Also, a ball hitch attachment is provided which is connectable to the cross arm for towing trailers.

The invention is self contained and does not have to rely upon any other devices such as a boom and cable of conventional recovery wrecker equipment. Rigid members support the towed vehicle so that no cables, straps or other flexible members are required which are more likely to break due to abrasion, rot or fatigue.

Thus, it is an object of this invention to provide a wheel lift tow assembly for mounting to the rear portion of a tow truck and which can be lowered to the ground surface and distended rearwardly with respect to the tow truck so as to position a cross arm adjacent the wheels of a vehicle to be towed. Wheel cradles then can be mounted about the wheels of the vehicle and attached to the cross arm, and the cross arm can be raised to lift the adjacent end of the vehicle and then retracted back toward the rear end of the tow truck so as to bring the vehicle to a position closely adjacent the rear of the tow truck.

Preferably, the rear end portion of the tow truck will have a low profile so that when the wheel lift tow assembly lifts the wheels of an automobile, the tow assembly can be retracted so as to bring in bumper and other parts of the automobile that extend in front of the wheels over the rear portion of the tow truck, thereby placing the weight of the load carried by the tow assembly as close as possible to the rear wheels of the tow truck.

Thus, it is another object of this invention to provide a wheel lift tow assembly for mounting to tow trucks which engages and raises the wheels of a vehicle and brings the vehicle in overlying relationship with respect to the rear portion of the tow truck, so as to place the load of the towed vehicle closely adjacent the rear wheels of the tow truck.

Another object of this invention is to provide a wheel lift tow assembly for tow trucks which is inexpensive to construct and to maintain, which engages only the wheels of a vehicle to be towed during the lifting and towing functions, and which can be safely and expediently operated to tow vehicles.

Another object of this invention is to provide a wheel lift tow assembly which is versatile in operation and which can be converted to a sling lift and tow configuration and to a ball hitch tow configuration.

Other objects, features and advantages of the present invention will become apparent upon reading the following specification, when taken in conjunction with the accompanying drawings.

BRIEF DESCRIPTION OF THE DRAWINGS

FIG. 4 is a detail illustration of a sleeve member, showing a portion broken away to illustration the connection between the sleeve member and the cross arm.

FIG. 5 is a detail illustration of the sleeve member of FIG. 4, showing the sleeve assembly in cross section.

FIG. 6 is an exploded perspective illustration of the ball trailer hitch and a portion of the cross arm.

FIG. 7 is a detail illustration of the cross arm and tow bar, showing the trailer hitch mounted thereto and with the cross arm pivoted with respect to the tow bar.

FIG. 8 is a detail of the top view of the tow bar and cross arm, with the trailer hitch attached thereto and with the cross arm pivoted with respect to the tow bar.

FIG. 9 is a detail illustration, similar to FIG. 8, but illustrating the cross arm retracted with respect to the tow bar in a towing position.

FIG. 13 is a partial perspective illustration of a cross bar with pivotable connections to the tow bar in both an upwardly extending axis and a longitudinally extending axis.

FIG. 14 is an exploded perspective illustration of portions of the cross bar and tow bar of FIG. 13, showing more details of the clevis.

DETAILED DESCRIPTION

Figure 1:
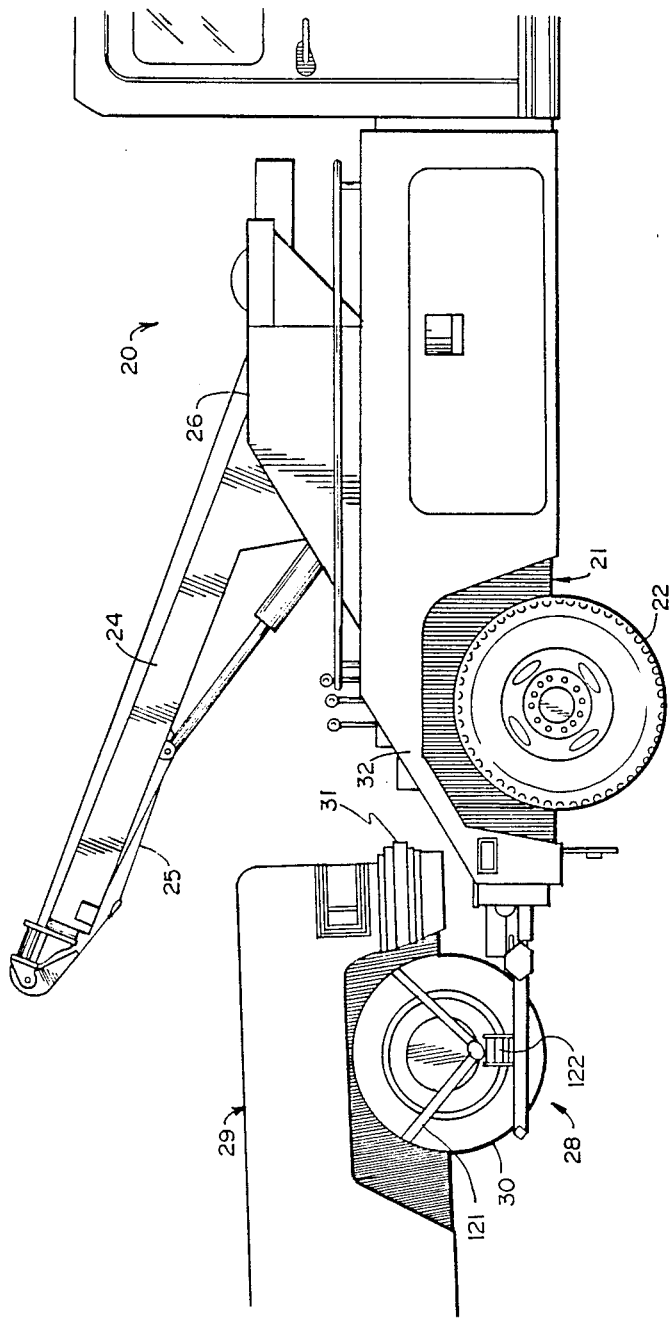
FIG. 1 is a side elevational view of the rear portion of a tow truck and the forward portion of a vehicle being towed, illustrating the position of the towed vehicle with respect to the tow truck when the wheel lift tow assembly of the present invention is utilized.

Referring now in more detail to the drawings, wherein like numerals indicate like parts throughout the several views, FIG. 1 illustrates a tow truck 20 of conventional construction which includes a chassis 21 with a frame, and rear driving wheels 22. The tow truck optionally includes a boom 24 with a cable 25 extending over the upper end of the boom, and a winch (not shown) is enclosed in housing 26 for paying out and reeling in the cable 25. Wheel lift tow assembly 28 is mounted to the rear frame of the tow truck 20 and extends rearwardly thereof behind the rear driving wheels 22. As illustrated in FIG. 1, the wheel lift tow assembly 28 is capable of lifting a towed vehicle, such as automobile 29, by engaging and lifting the wheels 30 of the automobile. After the automobile has been lifted, the wheel lift tow assembly can be retracted so as to bring the bumper 31 and other portions of the vehicle which extend in front of the wheels 30 to a position above the low profile rear end portion 32 of the tow truck 20. This places the load as transmitted through the wheels 30 of the automobile 29 closely adjacent the rear driving wheels 22 of the tow truck 20.

Figure 2:
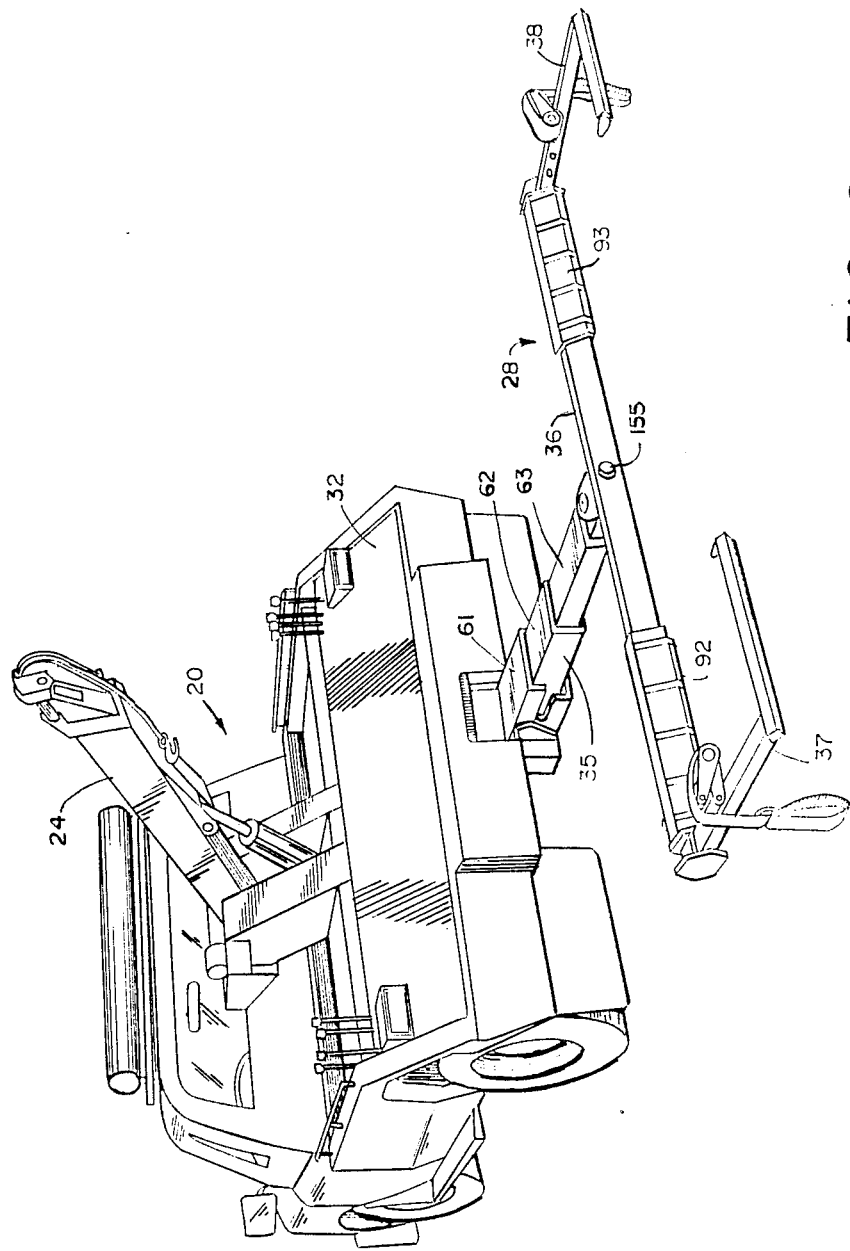
FIG. 2 is a rear perspective illustration of a portion of the tow truck and the wheel lift tow assembly.
Figure 3:
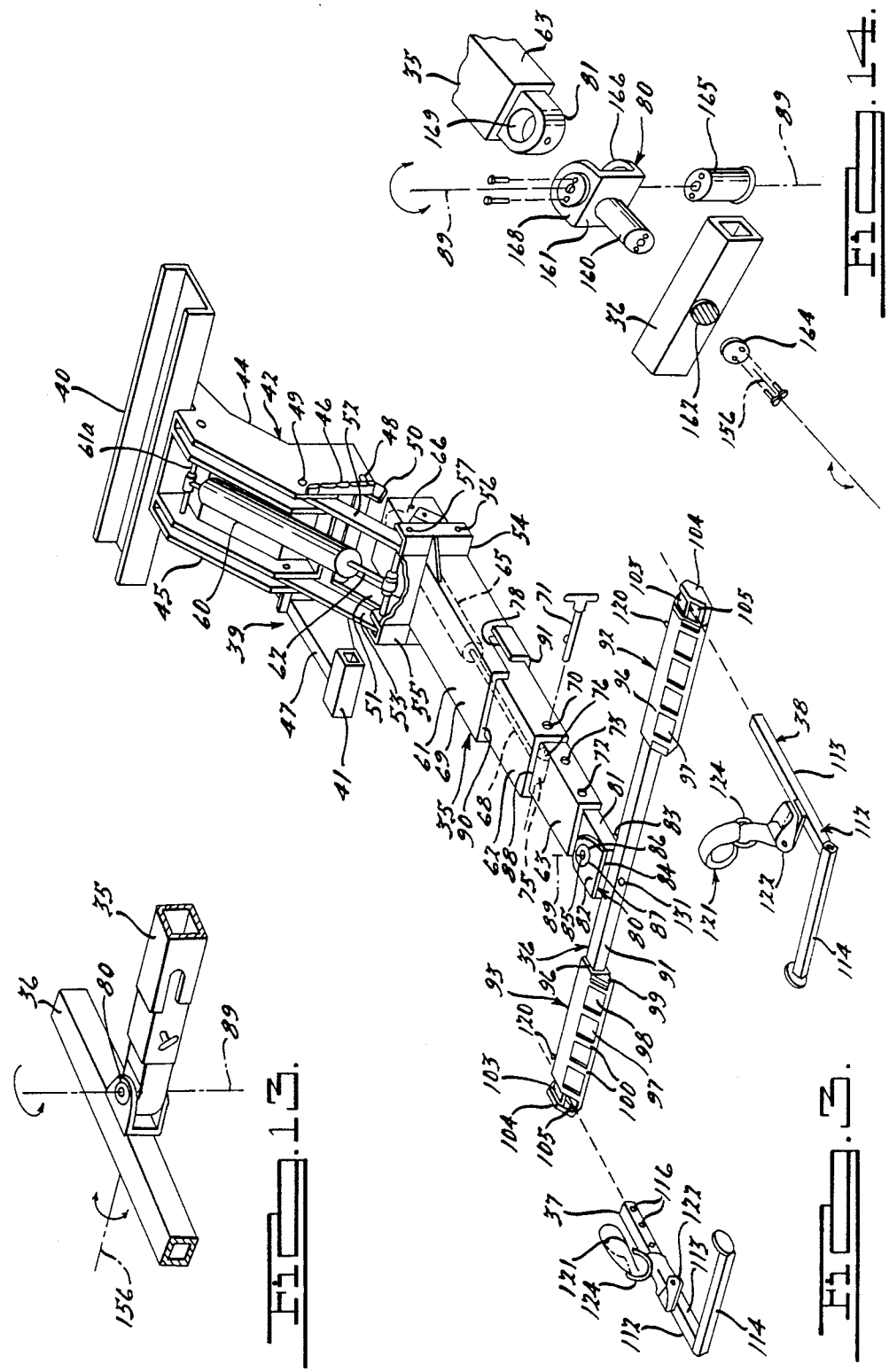
FIG. 3 is an exploded perspective illustration of an embodiment of the wheel lift tow assembly, with portions removed for clarity, and with some portions shown in spaced relationship with respect to other portions.

As illustrated in FIGS. 2 and 3, the wheel lift tow assembly 28 comprises a tow bar 35, cross arm 36 and wheel cradles 37 and 38. Tow bar 35 is supported by a parallel linkage 39 which is to mounted beneath the rear portion of the tow truck, to the frame elements 40 and 41 of the tow truck.

Parallel linkage 39 comprises rigid support bracket 42 which is to be mounted to and suspended from the frame elements 40 and 41 of the tow truck. Support bracket 42 includes a first pair of parallel support plates 44 and 45, each having one end portion thereof rigidly attached to frame element 40, and a second pair of parallel support plates 46 and 47 each having one end thereof attached to frame element 41. The lower, rearwardly-projecting end portions of the first pair of parallel support plates 44 and 45 are each rigidly connected to the lower, forwardly-extending portions of the second support plates 46 and 47, respectively. The joined lower portions of the parallel support plates 44–47 form a pair of vertically-extending arms of the parallel linkage, and the axles 48 and 49 extend through and are positioned in vertically spaced relationship with respect to one another by the forward assembly. Lower and upper pairs of parallel linkage arms 50, 51 and 52, 53 are each pivotably mounted to the axles 48 and 49 and extend rearwardly from the axles. A pair of vertically-oriented parallel linkage arms 54 and 55 are each pivotably mounted to the rear end portions of the lower and upper pairs of parallel linkage arms 50–53 by axles 56 and 57. With this construction, the vertical parallel linkage arms 54 and 55 can move vertically and substantially maintain their vertical orientation.

Hydraulic cylinder 60 is mounted generally between the pairs of parallel support plates 44–47 of support bracket 42, with the cylinder 60 being pivotably mounted to axle 61a mounted in bracket 42 and with its piston rod 62 attached to the axle 57 at the upper ends of the vertical parallel linkage arms 54 and 55. When piston rod 62 is distended, the vertically-oriented parallel linkage arms 54 and 55 will be moved downwardly while maintaining their vertical orientation, whereas when piston rod 62 is retracted, the vertically-oriented parallel linkage arms 54 and 55 will be raised while still maintaining their vertical orientation.

Tow bar 35 comprises three telescoping tubes 61, 62 and 63. The tubes 61-63 are rectangular in cross section, with tube 62 being smaller in cross section than tube 61, and with tube 63 being smaller in cross-section than tube 62. Tube 61 is rigidly mounted to the vertically-oriented parallel linkage arms 54 and 55 of parallel linkage 39, with the tube 61 having its length oriented in a horizontal attitude. Since the parallel linkage arms 54 and 55 are maintained in an upwardly-extending attitude, the base telescopic tube 61 will be maintained in its horizontal attitude as it is raised and lowered with the parallel linkage 39. Hydraulic cylinder 65 is positioned within the telescopic tow bar 35, with the cylinder being connected at its end portion to outer base telescopic tube 61 by connecting pin 66. The piston rod 68 of cylinder 65 is extendable beyond the rear end portion 69 of the telescopic tube 61, as indicated.

The intermediate telescopic tube 62 defines aligned sides openings 70 (only one shown) in its sidewalls, and connector pin 71 is insertable through the aligned openings. Similarly, the sidewalls of inner telescopic tube 63 define pairs of aligned openings 72 and 73 (only one of each shown). The distal end of piston rod 68 includes a boss 75, and the boss 75 includes an opening. The connector pin 71 is insertable through the aligned side openings 70 of the intermediate telescopic tube 62, through one of the pairs of aligned openings 72, 73, etc. of the inner telescopic tube, and through the opening 76 of the boss 75 of the piston rod 68. With this arrangement, when the piston rod 68 is moved with respect to its cylinder 65, both the inner and intermediate telescopic tubes 63 and 62 will move in unison with piston rod 68. If it is desirable to have the inner telescopic tube 63 distended further from within intermediate telescopic tube 62, the connector pin 71 can be withdrawn from the aligned openings, the inner telescopic tube 63 manually distended from intermediate telescopic tube 62 until another one of the openings 72, 73, etc. of the inner telescopic tube 63 is aligned with the openings 70 and the opening through boss 75, whereupon the connector pin 71 is reinserted through the aligned openings. In order that the intermediate telescopic tube 62 can be fully retracted within the outer telescopic tube 61, the rear end portion 69 of the outer telescopic tube 61 defines a slot 78 which receives connector pin 71.

Cross arm 36 is pivotably mounted to tow bar 35 by means of clevis 80. Protrusion 81 extends from inner telescopic tube 63 rearwardly towards cross arm 36, and clevis 80 includes upper and lower leaves 82 and 83 that straddle protrusion 81, and clevis mounting plate 84 which is rigidly connected to upper and lower clevis leaves 82 and 83. Vertically aligned openings (FIG. 14) are formed in the upper and lower clevis leaves 82 and 83 and through the protrusion 81, and axle assembly 85 extends through the aligned openings. Axle assembly 85 is oriented upwardly and includes a tube 86 extending through the aligned openings and an upper flange 87 that overlies upper clevis leaf 82. Tube 86 is internally threaded. With this arrangement, the axle assembly 85 supports cross arm 36 about upwardly-extending axis 89.

It will be noted that the upper portion 90 of the rear end portion 69 of the outer telescopic tube 61 overhangs the lower portion 91. Also, the upper surface of flange 87 of axle assembly 85 is relatively thin so that it can be retracted within the inner and outer telescopic tubes 62 and 61. With this arrangement, when both the inner and intermediate telescopic tubes 63 and 62 are retracted within the outer telescopic tube 61, the overhanging end portion 90 of the outer telescopic tube 61 will receive the side edges of the upper leaf 82 of clevis 80. Should the cross arm 36 be oriented at an angle other than a right angle with respect to the tow bar 35, the overhanging upper end portion 90 of the outer telescopic tube 61 will engage the side edge of the upper clevis leaf and cause the clevis and the cross arm 36 to be pivoted back to a right angle position about axis 89.

As illustrated in FIG. 3, cross arm 36 comprises a rectilinear bar 91 mounted intermediate its ends to clevis 80. Sleeve members 92 and 93 are mounted about the end portions of the rectilinear bar 91. Each sleeve member comprises a rectangular tube 96 that snugly fits about the rectilinear bar 91, and a wheel support skid 97 which is mounted to one side of rectangular tube 96. Wheel skid 97 includes a wheel-engaging surface 98 connected at its upper edge portion to the rectangular tube 96, and a flange 99 that is turned inwardly toward the same surface of the rectangular tube 96, so that the wheel-engaging surface 98 is angled so as to engage the surface of a wheel 30 (FIG. 1) in flat abutment. A plurality of ribs 100 are formed on the wheel-engaging surface 98 so as to avoid inadvertent turning of a wheel in engagement with the wheel-engaging surface 98.

Mounted to the outer ends of each sleeve member 92 and 93 is a rectangular socket 103, and protector plates 104 are mounted in a vertical plane to the outer surfaces of the sockets 103. The rectangular socket opening 105 of each socket 103 extends horizontally and is arranged to receive a wheel cradle 37 or 38.

As illustrated in FIG. 4, each sleeve member 92 and 93 includes a friction plate 108 internally thereof, and externally-threaded screw 109 extends through internally-threaded boss 110 into abutment with the friction plate. When screw 109 is rotated so that it projects further through boss 110 into the sleeve member 92 or 93, its friction plate 108 is forced against the rectilinear bar 91 of cross arm arm 36, thereby fastening the sleeve member to the rectilinear bar. On the other hand, when screw 109 is rotated in the opposite direction so as to be withdrawn from sleeve member 92 or 93, its friction plate 108 will no longer be forced against the rectilinear bar 91, and the sleeve member 92 or 93 can then be moved along the length of its end portion of the rectilinear bar.

As illustrated in FIG. 3, wheel cradles 37 and 38 are mirror images of each other, and each includes the sleeve member 92 or 93, and an L-shaped wheel support bracket 112 comprising a connector arm 113 and a wheel support arm 114 oriented at right angles with respect to each other. The connector arm 113 is rectangular in cross section and is sized to be snugly received through rectangular socket opening 105 of a sleeve member 92 or 93. A plurality of openings 116 are formed at spaced intervals along the length through connector arm 113. As illustrated in FIG. 4, a lock pin 118 is movably mounted to each sleeve member 92 and 93, with the lock pin extending through boss 119, and spring-urged toward the rectangular socket opening 105. Lever 120 is attached to lock pin 118 at a right angle to facilitate withdrawing lock pin 118 from its boss 119. A coil compression spring (not shown) is located within boss 119 and urges lock pin 118 toward the end of its sleeve member 92 or 93. With this arrangement, when the connector arm 113 of the L-shaped wheel support bracket 112 is inserted through a rectangular socket opening 105 of a sleeve member 92 or 93, the pin 118 can be withdrawn against the bias of its spring until the connector arm is properly located within the socket 113, and then the lever 120 released so that the spring will urge lock pin 118 toward engagement with the connector arm 113, and if one of the openings 116 of the connector arm 113 is aligned with the pin 118, the pin will be received in the opening and will lock the connector arm in place within the socket 103.

As illustrated in FIGS. 1 and 3, tie-down straps 121 are mounted to the connector arm 113 of each L-shaped wheel support bracket 112. A ratchet 122 is arranged to reel out and reel in the tie-down strap. The tie-down straps are made in the form of a loop with a metal ring 124 sewn in the end portion of the tie-down strap and surrounding the intermediate portion of the tie-down strap. With this arrangement, the loop of the tie-down strap is enlarged and fitted over the upper portion of the wheel 30 (FIG. 1) of the automobile, and the tie-down strap is then tightened by manipulation of the ratchet 122.

With this arrangement, the cross arm 36 of the wheel lift tow assembly can be lowered to ground level and positioned in front of the wheel 30 of the vehicle to be towed, and the L-shaped wheel support brackets 112 fitted about the wheels, with the connector arm 113 positioned beside and outside of a wheel and the wheel support arm 114 positioned behind the wheel, with the connector arm 113 aligned with the rectangular socket opening 105 of a sleeve member 92 or 93, and then the L-shaped wheel support bracket is moved forwardly so that its connector arm 113 is received in and telescopically moves through the rectangular socket opening 105 until the wheel support arm 114 engages the rear curved surface of the wheel 30. As the connector arm 113 is moved through the socket 103, the lock pin 118 is withdrawn from the socket 103. When the connector arm 113 has been moved as far as possible through the socket 103, the operator releases the lock pin 118, so that the lock pin is thrust by its spring through one of the openings 116 of the connector arm. This causes the wheel support arm 114 of the L-shaped wheel support bracket to be maintained at a fixed distance from its sleeve member 92 or 93 and the rectilinear bar 91, so that the L-shaped support bar 112 and its sleeve member 92 or 93 function as a wheel cradle, to cradle and support the wheel, to cause the wheel to be in engagement with the wheel support arm 114 and with the wheel skid 97 of the sleeve element.

After the wheel cradle has been formed about a wheel 30 and after the wheels of the automobile has been lifted from the ground by the assembly, tie-down straps 121 are looped over the upper portion of the wheels 30 (FIG. 1), and the ratchets 122 are tightened to shorten the lengths of the straps and to hold the wheels 30 in their cradles.

As illustrated in FIGS. 6, 7, 8 and 9, a trailer hitch 126 is provided for connection to cross arm 36. Trailer hitch 126 includes channel bracket 128 that fits about the rear, upper and lower surfaces of the rectilinear bar 91 of cross arm 36, and connector strap 129 which is rigidly mounted to the upper surface of channel bracket 128. An opening 130 is formed in channel bracket 128 to fit about the external part of spring ball assembly 131 that protrudes from the cross arm 36. Counter-bored opening 132 is formed through the forward portion of connector strap 129, and screw 134 is insertable through the opening 132 into the internally-threaded opening of tube 86 of axle assembly 85. This rigidly connects trailer hitch 126 to cross arm 36. The connector strap 129 projects rearwardly of the channel bracket 128, and a conventional ball trailer hitch element 136 is mounted thereon.

As illustrated in FIGS. 7 and 8, the trailer hitch 126 is movable with cross arm 36 about the upwardly-extending axis 89, so that the ball hitch is movable laterally with respect to tow bar 35. This enables the operator of the tow truck 20 to back the tow truck toward a trailer, and if the ball hitch 136 is slightly misaligned with respect to the hitch of the trailer, the ball hitch 136 can be moved laterally by rotating cross arm 36. On the other hand, when both the inner and intermediate telescopic tubes 62 and 63 are retracted as indicated in FIG. 9, the outer, upper end portion 90 of the outer telescopic tube 61 will engage the side edges of the upper leaf 82 of the clevis 80, causing the cross arm 36 to be moved back to a right angle attitude with respect to the tow bar 35, thereby causing the ball hitch 136 to be positioned along the centerline of the tow bar 35.

Figure 11:
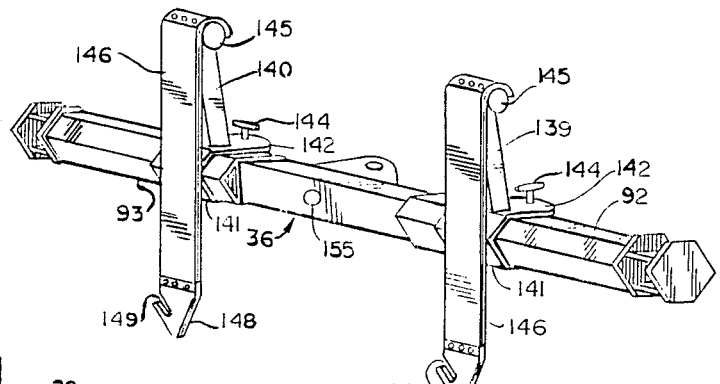
FIG. 11 is a perspective illustration of the cross arm with its sleeve members, and with the sling attachments mounted to the sleeve members and the wheel cradles removed from the cross arm.

As illustrated in FIG. 11, a pair of sling support bars can be mounted to cross arm 36. In the embodiment illustrated, the sling support bars 139 and 140 are mounted to the sleeve members 92 and 93, and each includes a bracket 141 at its lower end for slidably mounting about a sleeve member. Each bracket 141 is approximately C-shaped, and includes overhanging end portions 142 through which a retaining pin 144 is inserted so as to lock the bracket to the sleeve member. The brackets 141 hold the sling support bars parallel to each other in upwardly inclined attitudes, and the upper end portions 145 of each sling support bar is rounded.

Figure 12:
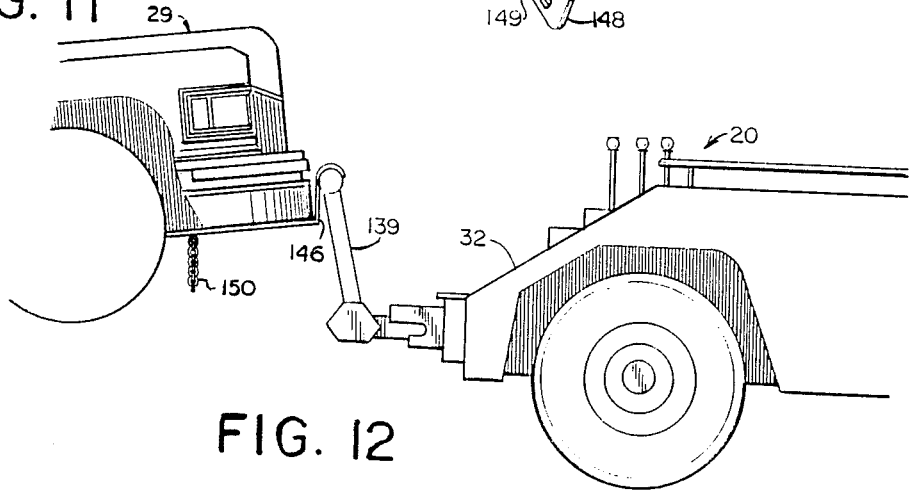
FIG. 12 is a schematic side elevational view of a tow truck and vehicle being towed by the tow truck with the sling attachments mounted to the tow assembly and the wheel cradles removed from the cross arm.

Flexible sling straps 146 are connected to each sling support bar. Each strap 146 has one of its ends rigidly connected to the rounded upper portion 145 of a sling support bar, and the free end of each sling strap has connected to it a connector hook 148 which defines a slot 149 for receiving a chain link or other flexible connector means 150 (FIG. 12). With this arrangement, the sling support bars 139 and 140 can be moved toward or away from each other by moving the sleeve elements 92 or 93 toward or away from each other or by mounting the sling support bars at different positions on the sleeve members. When the cross arm 36 is moved to the ground surface, the free ends of the sling straps 146 can be moved beneath a vehicle to be towed (FIG. 12), and a chain or other flexible connector can be connected to the frame of the vehicle and inserted into the slot 149 of the connector 148, thereby connecting the sling straps 146 to the vehicle. When the cross arm 36 is raised, the sling straps 146 will lift the bumper or other forwardly-protruding elements of the vehicle, thereby raising the front of the vehicle from the ground surface (FIG. 12).

Figure 10:
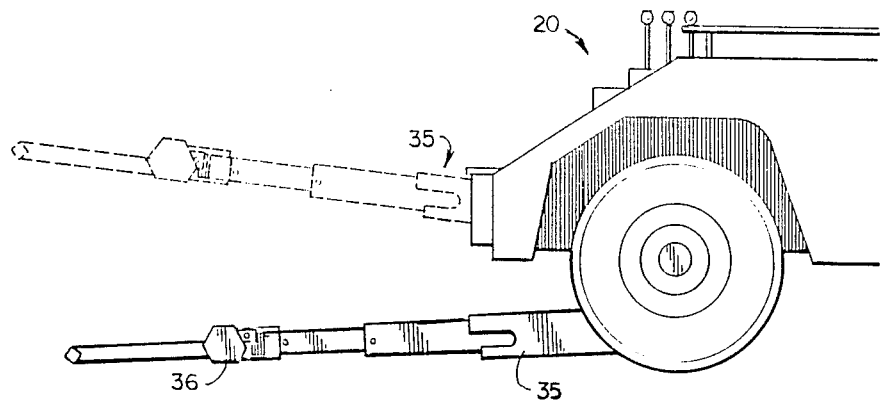
FIG. 10 is a schematic side elevational view of the rear portion of a tow truck and the wheel lift tow assembly in its lowered position, and which also illustrates in dash lines the wheel lift tow assembly in its raised position.

As illustrated in FIG. 10, the parallel linkage is constructed so that the tow bar 35 will be inclined downwardly at a 2° angle from the horizontal when the tow bar is moved to its lowermost position, and will be inclined upwardly at a 7° angle with respect to the horizontal when moved to its uppermost position. With this arrangement, the cross arm 36 can be positioned relatively low with respect to the tow truck so that the cross arm can reach downhill from the tow truck. When raised, the cross arm lifts the forward portion of the automobile high enough so that the automobile can extend over the rear portion of the tow truck (FIG. 1).

The hydraulic cylinders function as power means for raising and lowering the tow bar and for distending the telescopic sections of the tow bar. These hydraulics cylinders are controlled in a conventional manner by a pump and valves and by control levers located internally of the cab of the tow truck, with a duplicate set of control levers located at the rear, low profile portion of the tow truck. This is conventional in the art.

While the wheel lift tow assembly has been disclosed as including sleeve members 92 and 93 movable along the end portions of the cross arm 36, the assembly can be constructed without the sleeve members, with the L-shaped wheel support brackets 112 being slidably inserted through a socket opening 105 mounting directly to the end of a cross arm, and with the sling support bars 139 and 140 mounted directly on the cross arm.

In order to stabilize the cross arm 36 with respect to the tow bar 35, a spring-ball assembly 131 is mounted through the cross arm to engage the detent 133 in the rounded protrusion 81 of the tow bar. This forms a yieldable connection between the cross arm and the tow bar to hold the cross arm from freely pivoting about the upwardly extending axis 89.

As illustrated in FIGS. 13 and 14, the cross arm 36 can be mounted on a double pivot to tow bar 35, about an upwardly extending axis 89 as previously described, and also about a longitudinal axis 156 that is coextensive with the tow bar. As illustrated in FIG. 14, boss replaces the ball spring assembly and is mounted to the base 161 of clevis 80 and extends through opening 162 of cross arm 36. Retaining plate 164 holds the cross arm to the bars, so that cross arm 36 is rotatable about longitudinal axis 156. Pivot bearing 165 extends vertically through the openings of parallel clevis plates 166 and 168, through vertical opening 169 of the protrusion 81 of inner telescopic tube 63, so that cross arm 36 is rotatable about vertical axis 89. With this arrangement the cross arm can tilt about horizontal axis 156 that normally extends approximately longitudinally with respect to the towed vehicle, and can rotate about vertical axis 89, and if the towed vehicle and tow truck should become tilted with respect to each other, as when moving over a small hill or around a sharp turn, the universal connection between the tow truck and towed vehicle will tend to avoid any stress forces at the upwardly extending axis 89.

Figure 15:
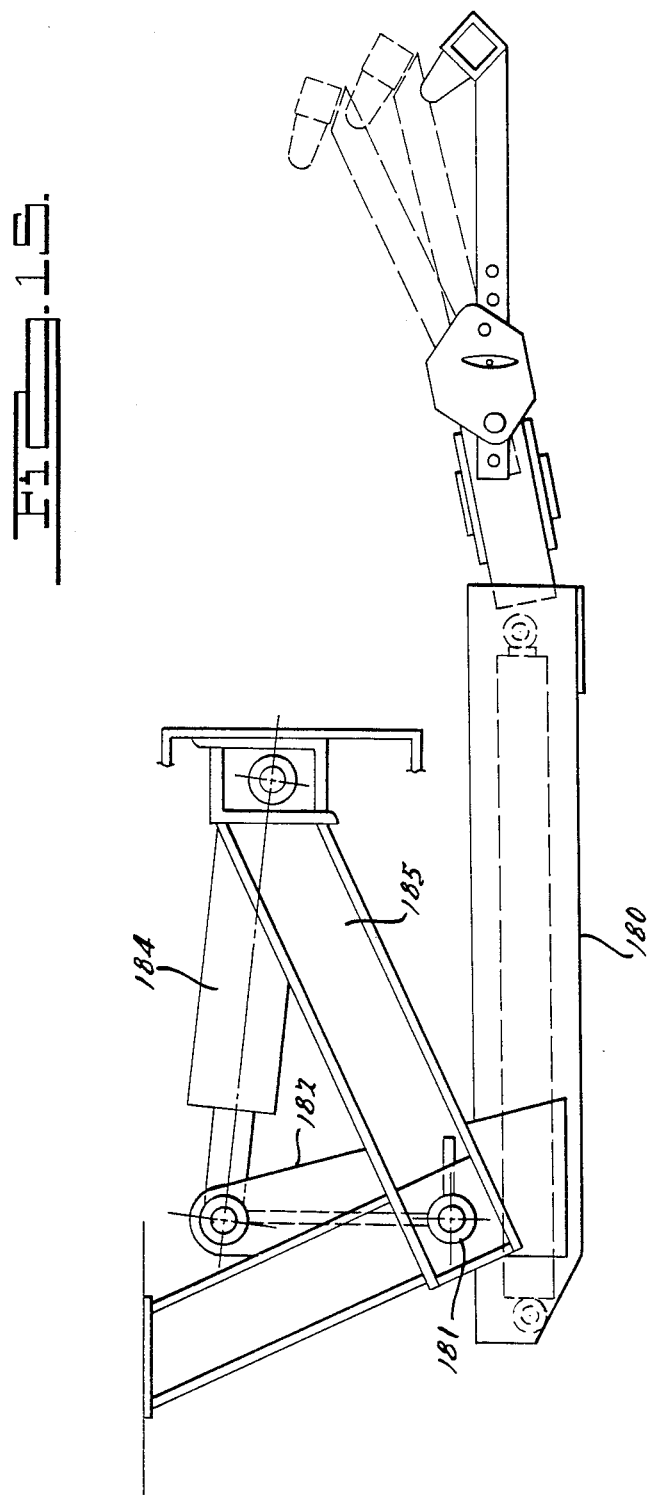
FIG. 15 is a side view of another embodiment of a power means for raising and lowering the tow bar and cross arm.

It will be noted that the invention has been disclosed in combination with a boom 24 and cable 25 and related elements; however, the boom, cable and related elements are not necessary for the operation of the disclosed invention, and the tow truck can be constructed and used with the disclosed invention and without the boom, cable, etc. Also, while power cylinders 60 and 65 have been disclosed as the means for moving the cross arm toward and away from the forward end of the tow bar and tow truck, and for raising and lowering the cross arm with respect to the tow truck, other manually operated or power assist means can be utilized for this function if desired. Also, while a parallel linkage has been disclosed as the means for raising and lowering the tow bar and crossarm, other means can be used for this purpose, if desired. For example, FIG. 15 illustrates a tow bar assembly 180 pivotably mounted to the tow truck on a single horizontal pivot 181. Actuator arm 182 is rigidly connected at its lower end to tow bar assembly 180, and hydraulic cylinder 184 extends between the upper portion of actuator arm and the support bracket 185. With this arrangement, cylinder 184 functions to tilt tow bar assembly 180 about horizontal pivot 181.

While this invention has been described in detail with particular reference to preferred embodiments thereof, it will be understood that variations and modifications can be effected within the spirit and scope of the invention as described hereinbefore and as defined in the appended claims.

We claim:

1. Apparatus for mounting to a tow truck and for lifting and towing wheeled vehicles comprising a tow bar including a forward end portion for mounting to a tow truck and a rear end portion for extending rearwardly from the tow truck, a cross arm mounted intermediate its ends to the rear end portion of said tow bar, and wheel cradles each including an L-shaped wheel support bracket having a connector arm releasably mounted to and extending transversely of said cross arm and a wheel support arm extending transversely of said connector arm, and free ends of the wheel support arms pointing toward one another such that an open interior side opposite said connector arm of each L-shaped member faces inwardly of a vehicle to be towed.

2. A pair of vehicle wheel retainers adapted for use with a vehicle towing assembly having a tow bar with a cross-arm attached to one end thereof, said cross-arm being provided with means for receiving one of a pair of "L" shaped members having an elongated connector arm whose one end engages said receiving means and whose other end engages a wheel support arm such that the connector arms of said pair of "L" shaped members extend transversely of said cross-arm and wherein free ends of the wheel support arms not engaging the connector arms point toward one another such that an open interior side of each L-shaped member faces inwardly of a vehicle to be towed; each of said "L" shaped members forming one of said wheel retainers.

3. The wheel retainers of claim 2 wherein said receiving means is a socket for slidably receiving one of said "L" shaped members.

4. The wheel retainers of claim 3 wherein each of said sockets is provided with a lock means for engaging one of a plurality of holes in the connector arm of said "L" shaped member to maintain said member in a fixed position relative to said cross-arm.

5. The wheel retainers of claim 2 wherein each of said respective connector arms is provided with a tie-down strap adapted to fit over and restrain the vehicle wheel resting in said retainer.

6. A pair of adjustable vehicle wheel cradles adapted for use with a vehicle towing assembly having a tow bar with a cross-arm attached to one end thereof, said wheel cradles comprising a pair of elongated sleeves, each disposed respectively on one end of said cross-arm and provided with means for receiving one of a pair of "L" shaped members having an elongated connector arm whose one end engages said receiving means and whose other end engages a transversely extending wheel support arm such that the connector arms of said pair of "L" shaped members are approximately parallel to each other and the wheel support arms of said "L" shaped members are approximately parallel to said cross-arm with their non-engaging ends pointed toward one another; each of said "L" shaped members and said elongated sleeves respectively forming one of said wheel cradles each of which has an open interior side facing the other wheel cradle and said member being adjustable axially with respect to both said tow bar and cross-arm.

7. The wheel cradles of claim 6 wherein said receiving means is a socket for slidably receiving one of said "L" shaped members.

8. The wheel retainers of claim 6 wherein each of said cradles is provided with a tie-down strap adapted to fit over and restrain the vehicle wheel resting in said cradle.

9. The wheel cradles of claim 7 wherein each of said sockets is provided with a lock means for engaging one of a plurality of holes in the connector arm of said "L" shaped member to maintain said member in a fixed position relative to said cross-arm.

10. The wheel retainers of claim 6 wherein means are provided for maintaining each of said sleeves in a fixed position relative to said cross-arm.

11. The wheel cradles of claim 6 wherein means are provided for maintaining each of said sleeves in a fixed position relative to said cross-arm.

12. A pair of adjustable vehicle wheel cradles adapted for use with a vehicle towing assembly having a retractable and elevatable tow bar with a cross-arm pivotally mounted to one end thereof, said wheel cradles comprising a pair of elongated sleeves, each slidably disposed respectively at one end of said cross-arm and provided with a socket for slidably engaging one end of an elongated connector arm which is one leg of a pair of "L" shaped members, the other end of said connector arm engaging a wheel support arm, which is the other leg of said "L" shaped member, such that the respective connector arms of said "L" shaped members extend transversely of the cross-arm and the wheel support arms have their non-engaging ends pointed at one another, each of said "L" shaped members and said elongated sleeves respectively forming one of said wheel cradles each of which having an open interior side opposite a connector arm and facing the other wheel cradle and said member being adjustable with respect to both said tow bar and cross-arm to accommodate different size vehicle wheels and widths of vehicles.

13. The wheel cradles of claim 12 wherein each of said cradles is provided with a tie-down strap to fit over and restrain the vehicle wheel resting in said cradles.

14. The wheel cradles of claim 12 wherein said socket is provided with lock means for engaging one of a plurality of holes in the connector arm of the "L" shaped member to maintain said member in a fixed position relative to said cross-arm.

* * * * *